US012718244B2

(12) United States Patent
Kurian et al.

(10) Patent No.: US 12,718,244 B2
(45) Date of Patent: Aug. 25, 2026

(54) CRYPTOCURRENCY STORAGE DISTRIBUTION

(71) Applicant: Bank of America Corporation, Charlotte, NC (US)

(72) Inventors: Manu Kurian, Dallas, TX (US); Joseph Castinado, Northglenn, CO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/963,066

(22) Filed: Nov. 27, 2024

(65) Prior Publication Data

US 2025/0086631 A1 Mar. 13, 2025

Related U.S. Application Data

(63) Continuation of application No. 18/230,261, filed on Aug. 4, 2023, now Pat. No. 12,243,059, which is a (Continued)

(51) Int. Cl.
*G06Q 20/36* (2012.01)
*G06Q 20/32* (2012.01)
(Continued)

(52) U.S. Cl.
CPC ..... *G06Q 20/4014* (2013.01); *G06Q 20/3224* (2013.01); *G06Q 20/36* (2013.01); (Continued)

(58) Field of Classification Search
CPC ........... G06Q 20/4014; G06Q 20/3224; G06Q 20/36; G06Q 20/382; G06Q 2220/00; (Continued)

(56) References Cited

U.S. PATENT DOCUMENTS 8,370,264 B1 2/2013 Wei et al.
9,219,824 B1 12/2015 Harper
(Continued)

FOREIGN PATENT DOCUMENTS

AU 2002303770 B2 * 6/2008 ............. G06Q 10/40
CN 107563747 A 1/2018

OTHER PUBLICATIONS

"An efficient method to enhance Bitcoin wallet security", Yi Liu, Oct. 2017, 2017 11th IEEE International Conference on Anti-counterfeiting, Security, and Identification (Year: 2017).*
(Continued)

*Primary Examiner* — Duan Zhang
(74) *Attorney, Agent, or Firm* — Banner & Witcoff, Ltd.

(57) ABSTRACT

A computing platform having at least one processor, a memory, and a communication interface may receive, via the communication interface, a transaction request from a participant. The computing platform may identify a user and one or more linked digital wallets associated with the transaction request. The computing platform then may execute an algorithm for comparing the transaction request to predetermined criteria associated with the one or more linked digital wallets. The computing platform may establish, via the communication interface, a first connection with a user computing device and, while the first connection is established, transmit to the user computing device transaction information which, when executed by the user computing device, causes a notification to be displayed on the user computing device.

20 Claims, 6 Drawing Sheets

Related U.S. Application Data continuation of application No. 16/576,100, filed on Sep. 19, 2019, now Pat. No. 11,790,363, which is a continuation of application No. 15/936,875, filed on Mar. 27, 2018, now abandoned.

(51) Int. Cl.
*G06Q 20/38* (2012.01)
*G06Q 20/40* (2012.01)
*H04L 9/06* (2006.01)
*H04L 67/104* (2022.01)
*H04W 12/63* (2021.01)

(52) U.S. Cl.
CPC ......... *G06Q 20/382* (2013.01); *H04L 9/0637* (2013.01); *H04L 67/104* (2013.01); *H04W 12/63* (2021.01)

(58) Field of Classification Search
CPC ... G06Q 20/065; H04L 9/0637; H04L 67/104; H04L 9/50; H04L 2209/805; H04L 9/3239; H04W 12/63
See application file for complete search history.

(56) References Cited

U.S. PATENT DOCUMENTS 9,672,499 B2 6/2017 Yang et al.
9,870,562 B2 1/2018 Davis et al.
10,055,715 B1 8/2018 Grassadonia et al.
10,373,160 B2 8/2019 Ranganathan
10,579,974 B1 3/2020 Reed
10,636,087 B1 * 4/2020 Bardouille ......... G06Q 20/1085
11,151,468 B1 * 10/2021 Chen ........................ G06N 3/09
2012/0047008 A1 2/2012 Alhadeff et al.
2013/0332358 A1 * 12/2013 Zhao .................... G06Q 20/425 705/44
2015/0161611 A1 * 6/2015 Duke ................. G06Q 20/4016 705/44
2015/0170112 A1 6/2015 DeCastro
2015/0324789 A1 11/2015 Dvorak et al.
2016/0071096 A1 3/2016 Rosca
2016/0078566 A1 * 3/2016 Farrell ................... G06Q 10/10 705/30
2016/0203477 A1 7/2016 Yang et al.
2016/0292663 A1 * 10/2016 Sagan .................... G06Q 20/10
2019/0012660 A1 1/2019 Masters
2019/0188657 A1 * 6/2019 Arora ............... G06Q 20/38215
2019/0236488 A1 8/2019 Achan et al.

OTHER PUBLICATIONS

Dec. 20, 2019—(US) Office Action—U.S. Appl. No. 15/936,875.
Aug. 18, 2020—(US) Office Action—U.S. Appl. No. 15/936,875.
“Abra Introduces World’s First All-in-One Cryptocurrency Wallet and Exchange with 20 Cryptocurrencies and 50 Fiat Currencies in a Single App”, Mar. 15, 2018, PR Newswire (Year: 2018).
Mann, “Two-factor authentication for the Bitcoin protocol”, International Journal of Information Security, Mar. 10, 2017 (Year 2017).

* cited by examiner

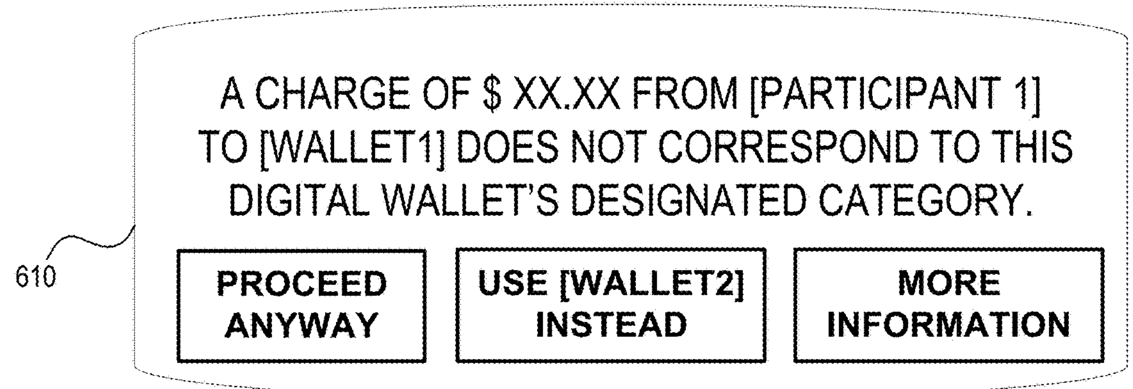
FIG. 6A
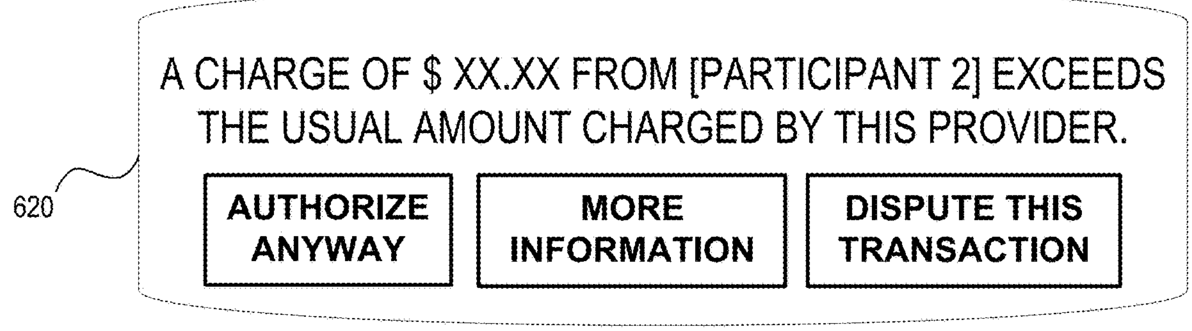
FIG. 6B
YOUR PURCHASE FROM [PARTICIPANT1] WAS MADE USING $YY.YY FROM [WALLET1] AND $ZZ.ZZ FROM [WALLET2], TOTALING $XXX.XX.
630
FIG. 6C

CRYPTOCURRENCY STORAGE DISTRIBUTION

CROSS REFERENCE TO RELATED APPLICATION

This is a continuation of U.S. application Ser. No. 18/230,261, filed Aug. 4, 2023 which is a continuation of U.S. application Ser. No. 16/576,100, filed Sep. 19, 2019, (now U.S. Pat. No. 11,790,363, issued Oct. 17, 2023) which is a continuation of U.S. application Ser. No. 15/936,875, filed Mar. 27, 2018, the entire disclosures of which are incorporated herein by reference.

BACKGROUND

Aspects described herein generally relate to electrical computers, data processing systems, and machine learning. In particular, one or more aspects of the disclosure relate to implementing and using a platform for storing a plurality of smart digital wallets wherein an abstracted intelligence layer allocates requested transactions to the digital wallets in accordance with predetermined criteria and machine learning.

SUMMARY

Aspects of the disclosure provide effective, efficient, scalable, and convenient technical solutions that address and overcome the technical problems associated with optimizing, maintaining, and utilizing computer systems and services. In particular, one or more aspects of the disclosure provide techniques for organizing a plurality of smart digital wallets and for enabling transactions to be intelligently allocated to digital wallets in accordance with predetermined criteria, which may include user-defined settings and/or machine learning.

In accordance with one or more embodiments, a computing platform having at least one processor, a memory, and a communication interface may receive, via the communication interface, a transaction request from a participant. The computing platform may identify a user and one or more linked digital wallets associated with the transaction request. The computing platform then may execute an algorithm for comparing the transaction request to predetermined criteria associated with the one or more linked digital wallets. The computing platform may establish, via the communication interface, a first connection with a user computing device and, while the first connection is established, transmit to the user computing device transaction information which, when executed by the user computing device, causes a notification to be displayed on the user computing device.

In some aspects, the computing platform may compare geolocation information of a transaction request to that of the predetermined criteria. The transaction information transmitted to the user computing device may include an indication of any discrepancy between the geolocation information of the transaction request and that of the predetermined criteria. A discrepancy in geolocation information may be, for example, a warning of a potentially fraudulent transaction since the transaction request was made remote from the user's location.

In some aspects, a participant may be associated with one or more participant categories. The computing platform may compare the one or more participant categories to that of the predetermined criteria. The transaction information transmitted to the user computing device may include an indication of any discrepancy between the participant category of the transaction to that of the predetermined criteria, for example to prevent a transaction from being charged to an unintended smart digital wallet or as a warning to the user that the transaction involves an expenditure of funds that may be needed for a different purpose.

In some aspects, the computing platform may compare the transaction request to previous transactions from the participant. The transaction information transmitted to the user computing device may include an indication of any significant discrepancy therebetween, for example as an indication of a potentially erroneous charge.

In some aspects, the computing platform may receive, from the user computing device, information responsive to an inquiry contained in the notification. A transaction confirmation may be transmitted to the participant after receiving the responsive information.

In some aspects, the computing platform may receive, from a participant computing device, cryptographic authentication information verifying the identity of the participant. The computing platform also may update the linked digital wallet(s) upon completing the transaction. In some examples, the computing platform may read the transaction request from a blockchain and may also record transaction confirmation instructions to the blockchain.

In some aspects, the computing platform may modify one or more linked digital wallets used for completion of the transaction request based on user defined settings, machine learning, or a combination thereof.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 6A-6C depict example graphical user interfaces for user computing devices in accordance with one or more example embodiments.

DETAILED DESCRIPTION

Figure 1:
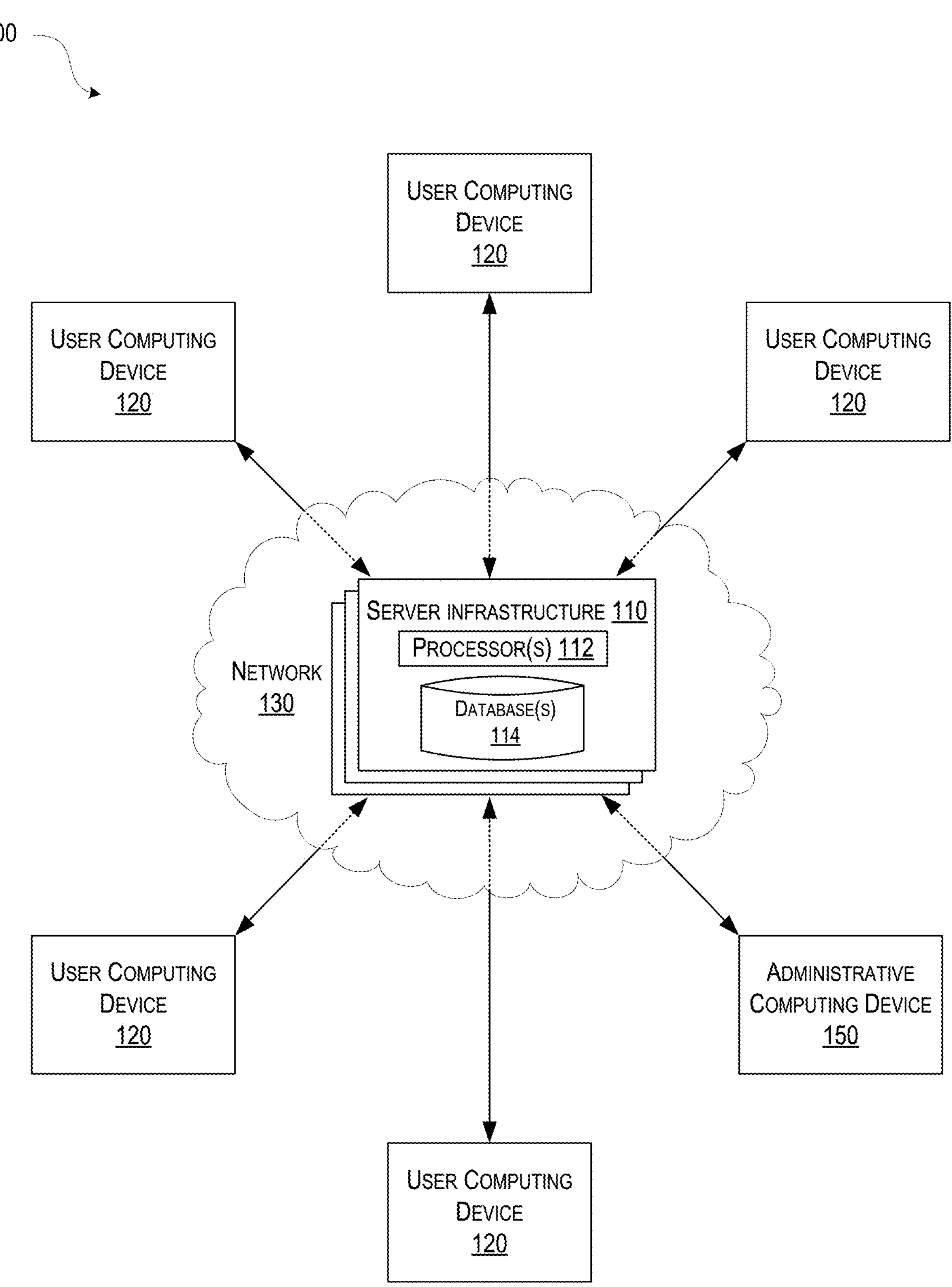
FIG. 1 depicts an illustrative example of centralized computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is not uncommon for individuals to have a number of physical device-based wallets, cryptocurrencies, savings accounts, and/or checking accounts (collectively referred to herein as “digital wallets”), which in some cases may be maintained by two or more different financial institutions. Physical device-based wallets may include, for example, (1) IoT based or internally secured access, (2) carrier-based hardware secured, or (3) NFC/Beacon-based wallets, which involves a combination of (1) and (2). For budgeting or organizational purposes, an individual may have some or all of the individual's digital wallets earmarked for specific purposes, e.g., mortgage/rent, utilities, groceries, insurance, entertainment, automobile, travel, and so forth. In accordance with some aspects disclosed herein, a system is provided for organizing a plurality of digital wallets and intelligently allocating transactions to the digital wallets in accordance with predetermined criteria, which may be based on user defined settings and/or machine learning. The term “smart digital wallet,” as used herein, refers to digital wallets from which funds are intelligently allocated in such a manner.

It is to be understood that the phraseology and terminology used herein are for the purpose of description and should not be regarded as limiting. Rather, the phrases and terms used herein are to be given their broadest interpretation and meaning. The use of “including” and “comprising” and variations thereof is meant to encompass the items listed thereafter and equivalents thereof as well as additional items and equivalents thereof. The use of the terms “mounted,” “connected,” “coupled,” “positioned,” “engaged” and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized “wallet” that serves to uniquely identify the user and enable the user to perform functions related to the decentralized P2P network. Through the wallet, the user may be able to hold tokens, funds, and/or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network and aggregated through execution of the one or more digital cryptographic hash functions and by performance of the one or more consensus algorithms to generate a single work unit (e.g., block), which may be added in a time-based, chronological manner to the blockchain through performance of network-specific protocols.

While in practice the term “blockchain” may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, balloting, health records, currency exchange and remittance, P2P transfers, ride sharing, online entertainment, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations" and "balance sheet transaction." A smart contract operation, as used herein, may describe one or more operations associated with a "smart contract," which may be one or more algorithms and/or programs stored on a blockchain and identified by one or more wallets and/or public keys within a decentralized P2P network. In performing a smart contract operation, each full node computing device within a decentralized P2P network may identify a block within a blockchain comprising the smart contract and, responsive to identifying the block associated with the smart contract, may execute the one or more algorithms and/or programs of the smart contract. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network. A wallet may be associated with a public key, which may serve to identify the wallet. In requesting performance of network operations, a private key associated with the wallet may be used to digitally sign the network operation requests.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and exploitation and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and for interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interlink each of the computing devices comprising server infrastructure 110.

Furthermore, in some embodiments, centralized computer system 100 may include a plurality of computer systems arranged in an operative networked communication arrangement with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and exploitation and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
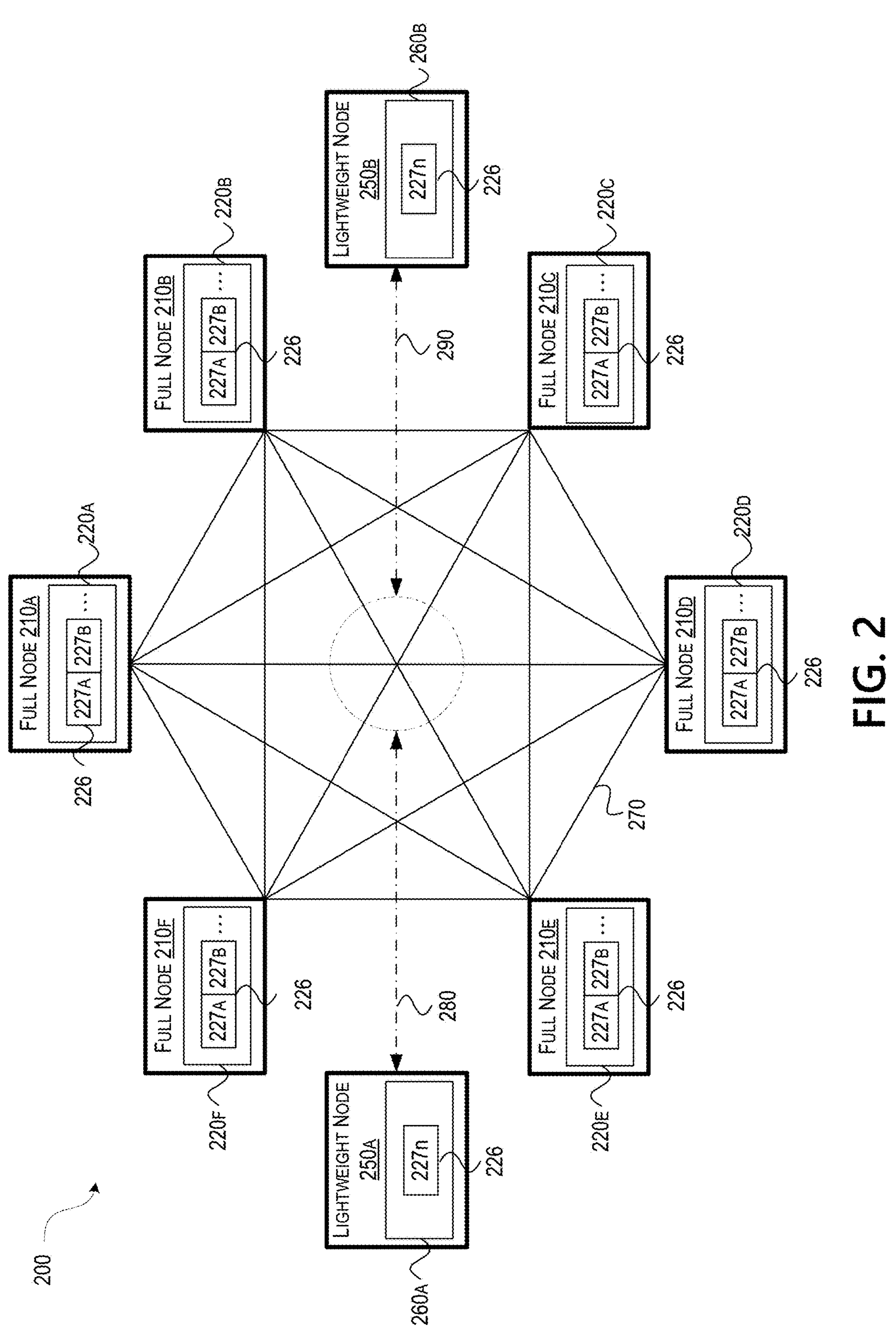
FIG. 2 depicts an illustrative example of decentralized P2P computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and thereby create decentralized P2P network 270. Furthermore, the execution of network protocols by the processors, ASIC devices, and/or GPUs of full node computing devices 210A-210F may cause full node computing devices 210A-210F to execute network functions related to blockchain 226 and maintain decentralized P2P network 270.

Lightweight node computing devices 250A and 250B may request execution of network functions related to decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to decentralized P2P network 270, which may entail a data transfer from a wallet associated with lightweight node computing device 250A to a wallet associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with the wallet of lightweight node computing device 250B. Processors of lightweight node computing device 250A may execute digital signature algorithms to digitally sign balance sheet transaction network function request 280 with the private key associated with the wallet of lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive broadcast of the network function through decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280 may, in turn, be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudorandomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated the wallet of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the wallet of the selected full node computing device to be used as the nonce.

In embodiments in which the consensus algorithm is delegated proof of stake (e.g., DpoS), a group of delegates are chosen from full node computing devices 210A-210F by each of computing devices 210A-210F, wherein full node computing devices 210A-210F are allowed to select delegates based on balance sheet holdings associated with the respective wallets. Full node computing devices 210A-210F, however, may not select themselves to be delegates. Once the group of delegates are chosen, the group of delegates from full node computing devices 210A-210F select a public key associated with a wallet of one of full node computing devices 210A-210F to serve as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key of a wallet associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F corresponding to the nonce to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase balance sheet holdings associated with itself by a predetermined amount. In some arrangements, each of full node computing devices 210A-210F may receive an equal portion of the data transfer amount specified by lightweight node computing device 250A for executing balance sheet transaction network function request 280. After the new block has been added to blockchain 226, balance sheet transaction network function request 280 may be considered to be executed and the data transfer from the wallet associated with lightweight node computing device 250A to the wallet associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function may, in turn, be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to decentralized P2P network 270, which may facilitate a dual data transfer between a wallet associated with lightweight node computing device 250B and a wallet associated with another node in decentralized P2P network 270, such as lightweight node computing device 250A, based on fulfillment of programmatic conditions established by a smart contract. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing the smart contract corresponding to smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with the wallet of lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 250B for executing smart contract operation network function request 290. After the new block has been added to blockchain 226, smart contract operation request 290 may be considered to be executed and the data transfer from the wallet associated with lightweight node computing device 250B to the public key associated with the smart contract may be registered.

The smart contract may be configured to hold the data transfer from the wallet associated with lightweight node computing device 250B until fulfillment of certain predetermined criteria hardcoded into the smart contract are achieved. The smart contract may be configured such that it serves as an intermediate arbiter between entities within the decentralized P2P network 270 and may specify details of a dual data transfer between entities.

For example, the smart contract corresponding to smart contract operation request 290 may be one or more algorithms and/or programs stored on a block of blockchain 226. The smart contract may be identified by one or more wallets and/or public keys within decentralized P2P network 270. Lightweight node computing device 250B may transmit smart contract operation network function request 290 to decentralized P2P network 270, which may cause execution of the corresponding smart contract that facilitates a dual data transfer between a wallet associated with lightweight node computing device 250B and a wallet associated with another node in decentralized P2P network 270, such as lightweight node computing device 250A, based on fulfillment of programmatic conditions established by the smart contract. In the processes of adding the block comprising smart contract operation request 290 to blockchain 226, each of full node computing devices 210A-210F may identify the block within blockchain 226 comprising the smart contract, associate the data transfer entailed by smart contract operation request 290 with the smart contract, and execute the one or more algorithms and/or programs of the smart contract. In this instance, given that the smart contract facilitates a dual data transfer and that data transfer has yet to be received from another node (e.g., lightweight node computing device 250A), each of full node computing devices 210A-210F may execute the smart contract without fulfillment of the programmatic conditions established by the smart contract. Accordingly, the funds transferred by lightweight node computing device 250B may remain in the smart contract until the data transfer from the other node is also associated with the smart contract.

Moving forward, lightweight node computing device 250A may also request a smart contract operation related to decentralized P2P network 270, which may conclude the dual data transfer between the wallet associated lightweight node computing device 250A and the wallet associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract corresponding to the smart contract operation network function request. The smart contract operation network function request may further include the public key associated with the smart contract. Processors of lightweight node computing device 250A may execute digital signature algorithms to digitally sign the smart contract operation network function request with the private key associated with the wallet of lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices

210A-210F may receive an equal portion of the data transfer amount specified by lightweight node computing device 250A for executing the smart contract operation network function request. After the new block has been added to blockchain 226, the smart contract operation transaction network function request 290 may be considered to be executed and the data transfer from the wallet associated with lightweight node computing device 250A to the public key associated with the smart contract may be registered.

When the smart contract receives the data value from each of lightweight node computing device 250A and lightweight node computing device 250B, the execution of the smart contract by each of full node computing devices 210A-210F may cause transfer of the data value from lightweight node computing device 250A to lightweight node computing device 250B and the data value from lightweight node computing device 250B to lightweight node computing device 250A.

For example, lightweight node computing device 250A may transmit the smart contract operation network function request to decentralized P2P network 270, which may cause execution of the corresponding smart contract that facilitates the dual data transfer. In the process of adding the block comprising the smart contract operation request provided by lightweight node computing device 250A to blockchain 226, each of full node computing devices 210A-210F may identify the block within blockchain 226 comprising the smart contract, associate the data transfer entailed by smart contract operation request of lightweight node computing device 250A with the smart contract, and execute the one or more algorithms and/or programs of the smart contract. In this instance, given that the smart contract facilitates a dual data transfer and that data transfers have been received from lightweight node computing device 250A and lightweight node computing device 250B, each of full node computing devices 210A-210F may execute the smart contract as fulfillment of the programmatic conditions established by the smart contract has occurred. Accordingly, the funds allocated to the smart contract by each of lightweight node computing device 250A and lightweight node computing device 250B may be respectively distributed to the intended counterparty.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer. Other smart contracts may be included which include algorithms, programs, and/or computer-executable instructions which cause the performance of one or more functions related to at least cryptocurrency, digital content storage and delivery, entity authentication and authorization, digital identity, marketplace creation and operation, internet of things (e.g., IoT), prediction platforms, balloting, health records, currency exchange and remittance, P2P transfers, ride sharing, competitive online entertainment, trading platforms, and real estate, precious metal, and work of art registration and transference.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and performance of network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 226 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3B:
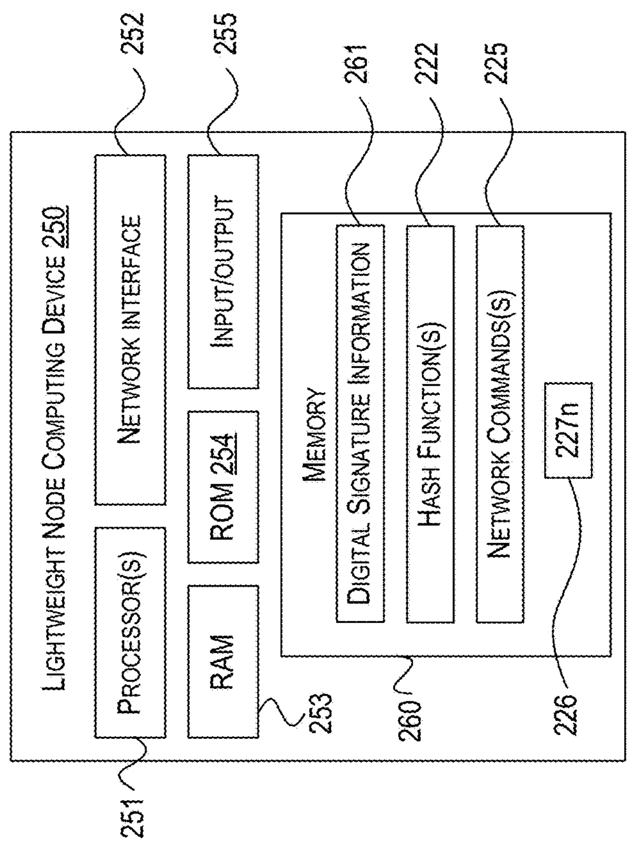
FIG. 3B depicts an illustrative example of a lightweight node computing device that may be used in accordance with one or more illustrative aspects described herein.
Figure 3A:
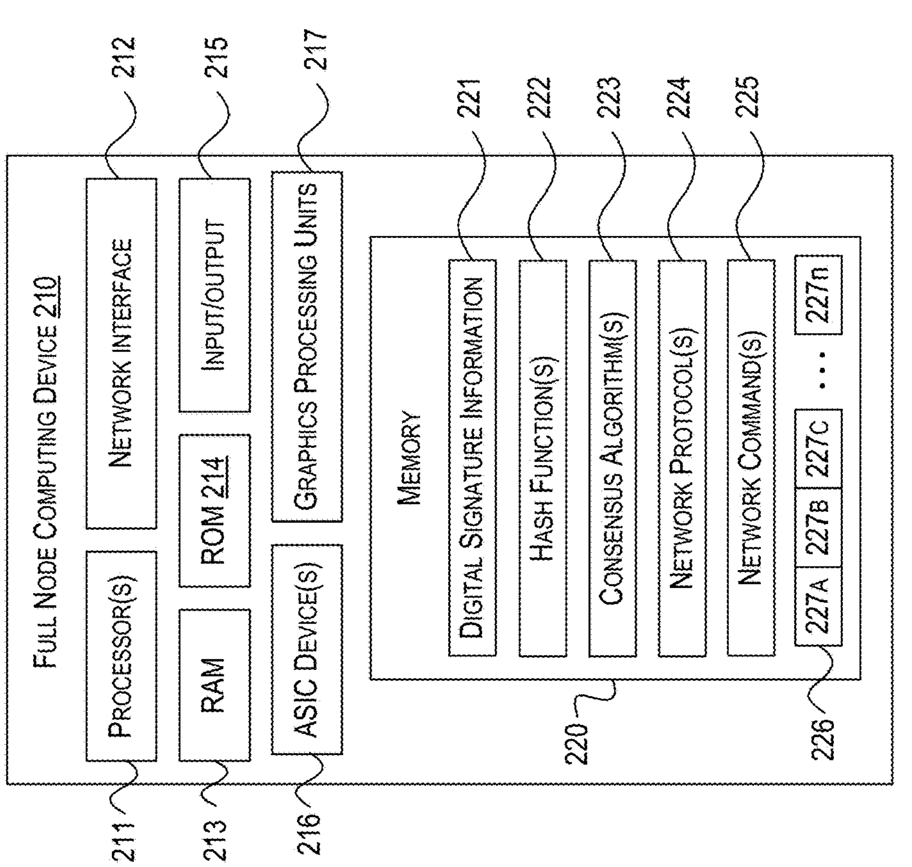
FIG. 3A depicts an illustrative example of a full node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, etc.), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227*n*, wherein block 227A represents the first block (e.g., genesis block) of blockchain 226 and block 227*n* represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but may be configured with different programs, software, etc.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, etc.), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing support and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such may be the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227*n*, wherein block 227*n* represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227*n*, wherein block 227A represents the first block (e.g., genesis block) of blockchain 226 and block 227*n* represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Cryptocurrency Storage Distribution

Figure 4:
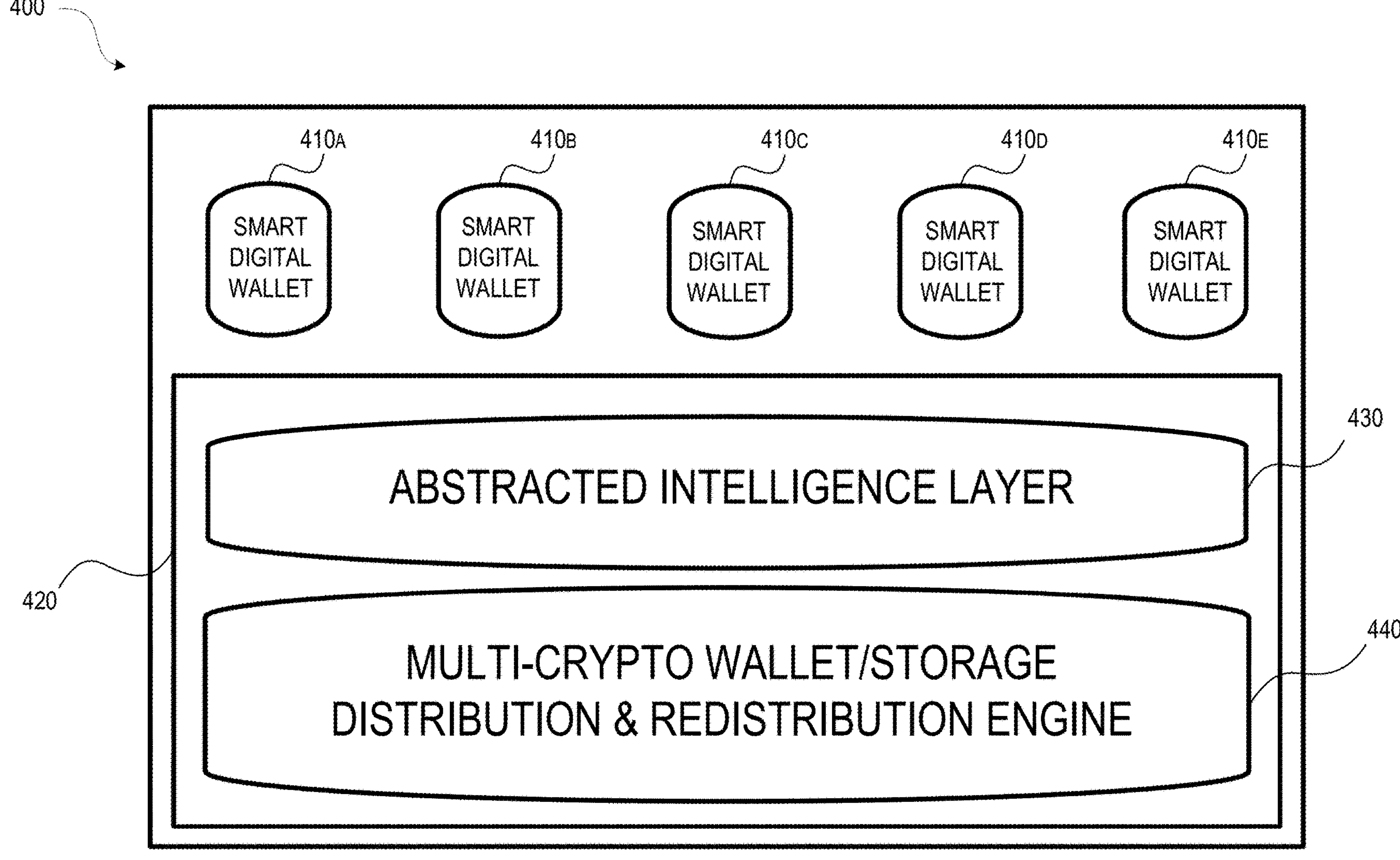
FIG. 4 depicts an illustrative example of a system for intelligently distributing cryptocurrency from a plurality of smart digital wallets in accordance with one or more illustrative aspects described herein.

FIG. 4 depicts an illustrative example of a system 400 for organizing a plurality of smart digital wallets 410*a*-410*e* and intelligently distributing cryptocurrency in accordance with one or more illustrative aspects described herein. A crypto controller subsystem 420 includes an abstracted intelligence layer 430 and a multi-crypto wallet/storage distribution and redistribution engine 440. The smart digital wallets 410*a*-410*e* may contain different cryptocurrencies and/or may correspond to user accounts designated for particular purposes. The abstracted intelligence layer 430 may contain an index or key identifying criteria associated with the plurality of smart digital wallets 410*a*-410*e*. For example, the index or key may indicate that smart digital wallet 410*a* stores a first cryptocurrency "B1" designated for general use; smart digital wallet 410*b* stores a second cryptocurrency "B2" designated for general use; smart digital wallet 410*c* is a checking account designated for mortgage/rent; smart digital wallet 410*d* is a checking account designated for utilities, groceries, and insurance premiums; and smart digital wallet 410*e* is a physical device-based wallet designated for leisure/entertainment expenses. The designations for the smart digital wallets 410*a*-410*e* initially may be made via user-defined settings and/or may be created and/or modified by abstracted intelligence layer 430 based on machine learning. For example, a user may initially designate smart digital wallet 410*c* only for mortgage/rent, but subsequently use the digital wallet 410*c* for automobile payments over a period of several months. In this example, the abstracted intelligence layer 430 may "learn" that the user intends to use the digital wallet 410*c* for automobile payments in addition to mortgage/rent.

The crypto controller subsystem 420 may perform a variety of functions, including performing conversions of cryptocurrencies and validating transactions against criteria associated with the respective digital wallet(s). For example, a user may attempt to purchase theater tickets using digital wallet 410*a* which stores the first cryptocurrency "B1." The abstracted intelligence layer 430 may determine, after making any needed conversions, that the balance of the first cryptocurrency "B1" in digital wallet 410*a* is insufficient to cover the cost of the theater tickets. The abstracted intelligence layer 430 may then determine, after making any needed conversions, that the balance of the second cryptocurrency "B2" in smart digital wallet 410*b* is sufficient to cover the deficiency. The multi-crypto wallet/storage distribution and redistribution engine 440 then may complete the transaction using the balance of the first cryptocurrency "B1" together with the needed amount of the second cryptocurrency "B2." In this manner, the cryptocurrency storage distribution may provide excess withdrawal protection for the individual smart digital wallets.

As another example, the abstracted intelligence layer 430 may assist a user in the payment of an unanticipated expense, such as automobile repair. Although funds sufficient to cover the automobile repair may be available in several digital wallets, the abstracted intelligence layer 430 may recognize that funds in some of the digital wallets are earmarked for defined expenses, e.g., mortgage, utilities, and so forth. The abstracted intelligence layer 430 may determine that smart digital wallet 410*e*, for example, has surplus funds that may be used to cover the automobile repair. The multi-crypto wallet/storage distribution and redistribution engine 440 then may transmit instructions for completing the transaction using the surplus funds from smart digital wallet 410*e*. The abstracted intelligence layer 430 also may replenish funds that are "borrowed" from a digital wallet at a later time, if possible.

The abstracted intelligence layer 430 also may serve to validate requested transactions against criteria associated with the respective digital wallet(s). For example, a user may seek to purchase tickets to a sporting event using a smart digital wallet 410*c* that is designated only for mortgage/rent. In this example, the abstracted intelligence layer 430 may generate an alert warning the user that the requested purchase does not correspond to the criteria associated with the digital wallet. The notification may include options for the user to allocate the transaction to a different digital wallet(s) or to proceed with the requested transaction notwithstanding the discrepancy. As another example, upon determining that a charge for a particular utility varies significantly from amounts historically charged for the utility, the abstracted intelligence layer 430 may generate an appropriate user alert. The notification may prompt the user to investigate whether the charge was potentially erroneous. The user may dismiss the alert if he or she is aware of a justification for the suspicious charge, e.g., a higher energy bill was due to an unusually cold month.

Figure 5:
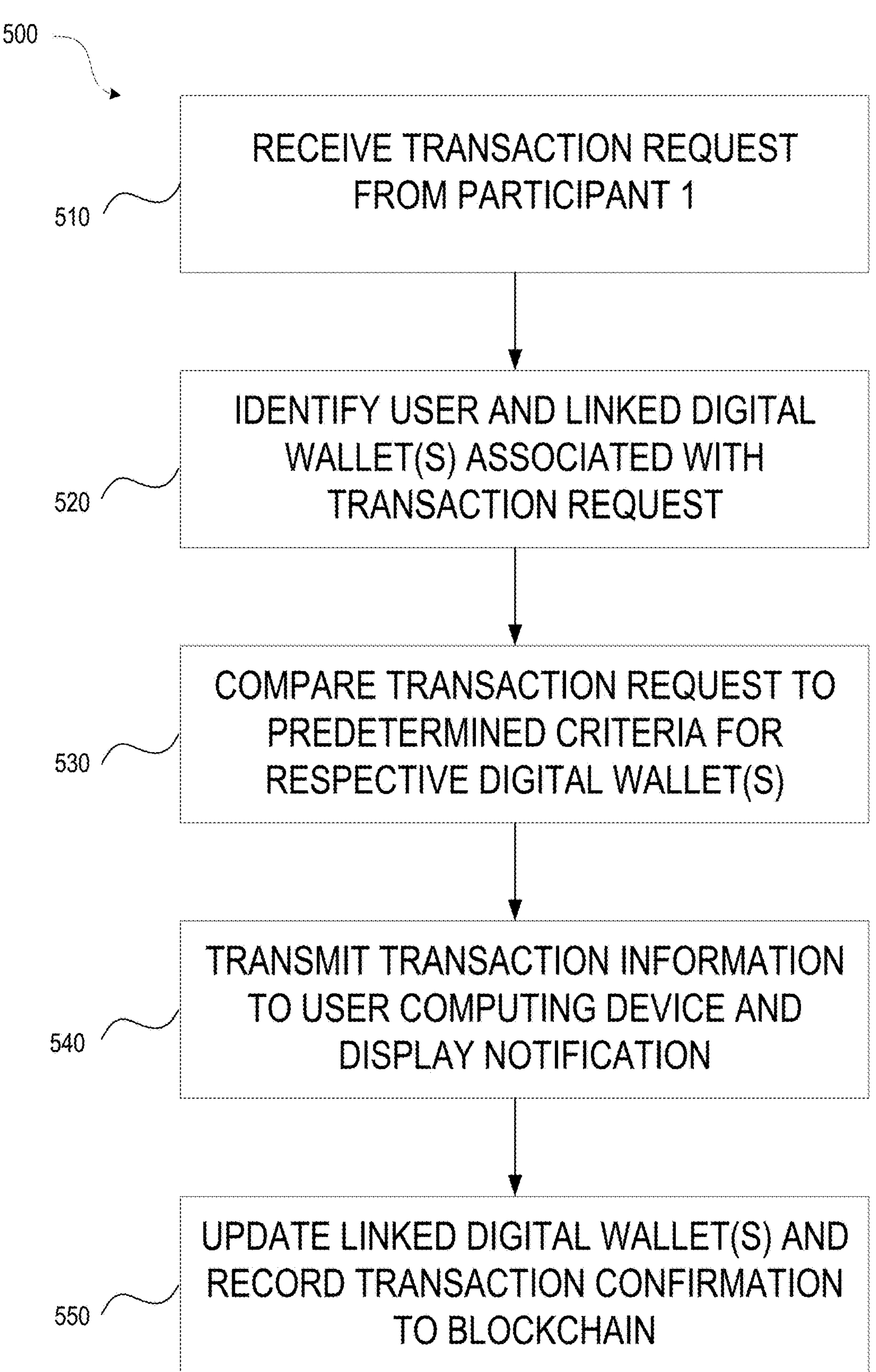
FIG. 5 is an illustrative event sequence for processing transaction requests for a plurality of smart digital wallets in accordance with one or more illustrative aspects described herein.

FIG. 5 shows an illustrative event sequence 500 in accordance with one or more aspects described herein. At step 510, a computing platform, such as a full node computing device 210 or lightweight node computing device 250 as previously described, may receive, from a blockchain 226, a transaction request from a first participant, such as a goods or services provider. At step 520, the computing platform 210 or 250 may identify the user and a plurality of linked digital wallets 410*a*-410*e* as previously described. In some examples, all of the digital wallets 410*a*-410*e* may be managed by a common financial institution. In other examples, the digital wallets 410*a*-410*e* may be managed by two or more different financial institutions. At step 530, the crypto controller subsystem 420 may execute an algorithm for comparing the transaction request to predetermined criteria for the respective digital wallet(s). The computing platform 210 or 250 may establish, via the communication interface 212 or 252, a first connection with a user computing device 120 and transmit transaction information to the user computing device 120. In some instances, in transmitting the transaction information to the user computing device 120, the computing platform 210 or 250 may cause the user computing device 120 to display one or more user interfaces presenting the transaction information and/or including other content generated based on the transaction information. Examples of user interfaces that may be displayed and/or otherwise presented by the user computing device 120 are described below in connection with FIGS. 6A-6C. At step 550, the computing platform 210 or 250 may update the one or more linked digital wallets based on the transaction. In some examples, the computing platform 210 or 250 may record transaction confirmation instructions to the blockchain 226 in the manner previously described.

In some examples, the computing platform may transmit transaction information to an administrative computing device 150 and/or may receive information from an administrative computing device 150. Administrative information, such as sales taxes paid or an identification of transactions having tax implications, may be transmitted by the multi-crypto wallet/storage distribution and redistribution engine 440, for example, to the administrative computing device 150. Information pertaining to regulatory changes or business rules, for example, may be transmitted from the administrative computing device 150 to the crypto controller subsystem 420, which in turn may use such information to refine the criteria used in the intelligent cryptocurrency distribution as described herein.

In some examples, geolocation services may provide additional transaction information. As one example, geolocation services may be used to detect potentially fraudulent transactions. The abstracted intelligence layer 430 may determine that the user is physically located in a different state or country than the state or country from which a transaction request is received. Upon identifying such discrepancies in locations, abstracted intelligence layer 430 may generate appropriate user alerts to resolve whether the requested transaction was authorized. Geolocation services also may assist the computing platform in categorizing transactions. For example, if a user is known to be traveling on business to a given destination on certain dates, certain transactions, such as food purchases and hotel accommodations, made while at the destination may be categorized as business expenses.

In some examples, the crypto controller subsystem 420 may modify one or more linked digital wallets used for completion of a transaction request based on user defined settings, machine learning, or a combination thereof. For example, a user may initiate a transaction that seeks to use digital wallet 410*a* which stores the first cryptocurrency "B1." The abstracted intelligence layer 430 may determine that the then-current value or exchange rate of the first cryptocurrency "B1" is unfavorable, such that it would be more advantageous for the user to complete the purchase using the second cryptocurrency "B2" from digital wallet 410*b*, which may have a more favorable value or exchange rate at the time of the requested purchase. Upon the abstracted intelligence layer 430 making such a determination, the computing platform may generate a user inquiry asking whether the user wishes to change the digital wallet used for the purchase or, if user settings so provide, a notification alerting the user that the different digital wallet was substituted to complete the purchase due to its more favorable exchange rate. The abstracted intelligence layer 430 may execute user defined rules or tolerances and/or machine learning in a similar manner to implement spending limits or limit-order or stop-limit type transactions, in addition to leveraging smart contracts to effectively self-regulate currency trades.

Examples of graphical user interfaces for user computing devices are shown in FIGS. 6A-6C. In some examples, a user interface may include a notification that a transaction was completed, with or without indicating the smart digital wallet(s) used for the transaction. FIG. 6A shows an example of a user interface 610 that alerts a user that a transaction requested from a first participant would involve use of a digital wallet whose criteria differ from those of the requested transaction. Referring to a previous example, a user may seek to purchase tickets to a sporting event using a smart digital wallet 410*c* that is designated only for mortgage/rent. The abstracted intelligence layer 430 may generate an alert 610 warning the user that the requested purchase does not correspond to the criteria associated with the digital wallet. The notification may include options, such as an instruction to proceed with the requested transaction notwithstanding the discrepancy. In some cases, the abstracted intelligence layer 430 may determine that a different digital wallet appears to be more appropriate for the requested transaction, in which case the notification 610 may include an option the for the user to reallocate the transaction to the recommended digital wallet. The notification 610 may include yet other options, such as requesting more information. Selecting the "more information" option may generate a further user interface explaining, for example, that the smart digital wallet 410*c* is designated only for mortgage/rent payments whereas the requested transaction is for tickets to a sporting event.

FIG. 6B shows an example of a notification 620 that a charge from a second participant exceeds amounts historically charged by the participant. As in a previous example, a charge from a particular utility may significantly exceed amounts previously charged by the same utility. The abstracted intelligence layer 430 may generate a user alert 620, which may prompt the user to investigate whether the charge was potentially erroneous. The alert may include an option to dismiss the alert, for example if the user is aware of a justification for the charge, e.g., a higher energy bill was due to an unusually cold month. The alert may include a "more information" option, the selection of which may generate a further user interface explaining, for example, that the charged amount is a particular value whereas the average amount charged by the utility is a significantly lower amount. As the abstracted intelligence layer 430 gathers additional data, including responses to user inquiries and additional transaction data, the criteria may be further refined through machine learning. In this example, the abstracted intelligence layer 430 may learn seasonal patterns for utility charges so that subsequent transactions that correspond to normal seasonal fluctuations may not be flagged as unusual charges. The user interface 620 also may include an option for disputing the transaction. Selecting this option may generate a further user interface with instructions for contacting the participant.

FIG. 6C shows an example of a user interface 630 altering a user that a transaction was completed using funds from multiple digital wallets. As stated in a previous example, a user may attempt to purchase theater tickets using digital wallet 410*a* which stores a first cryptocurrency "B1," the balance of which is insufficient to cover the cost of the requested purchase. The multi-crypto wallet/storage distribution and redistribution engine 440 may complete the transaction using the balance of the first cryptocurrency "B1" together with the needed amount of the second cryptocurrency "B2." The user interface 630 may inform the user that the purchase was completed using the specified amounts from the respective digital wallets and the total cost of the transaction. If desired, though not illustrated, the user interface 630 may prompt the user to either authorize the proposed distribution of cryptocurrencies, modify the distribution to use different digital wallet(s), or cancel the requested transaction.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. Although reference is made herein to blockchain technology, the concepts described herein may be implemented using different techniques and platforms, such as a centralized computer system in which user computing devices are configured to communicate with server infrastructure through a network.

What is claimed is:

1. Non-transitory computer readable media storing instructions that, when executed by a processor, cause a computing platform to:

- receive, based on information corresponding to a transaction request, information corresponding to at least two linked digital wallets associated with the transaction request and being associated with a user, wherein each linked digital wallet of the at least two linked digital wallets comprises lightweight nodes of a decentralized peer-to-peer network;
- determine, based on an exchange rate, whether an amount specified in the transaction request is larger than an available amount in each linked digital wallet of the at least two linked digital wallets;
- modify, automatically by an abstract intelligence layer and based on learning corresponding to historical usage patterns, digital wallet associations for different transaction types, wherein each linked digital wallet of the at least two linked digital wallets is associated with a key identifying criteria associated with a corresponding digital wallet and wherein the criteria comprise a use type designation and a currency type;

execute a digital signature algorithm using private/public key pairs to authenticate at least one linked digital wallet of the at least two linked digital wallets;

complete, automatically, the requested transaction using a first amount from a first linked digital wallet based on a first exchange rate and a second amount from a second linked digital wallet based on a second exchange rate;

teach, based on a completed transaction and responses to user inquiries, the abstract intelligence layer to learn new transaction patterns; and send, to a user computing device, transaction information for display of a notification on the user computing device.

2. The non-transitory computer readable media of claim 1, wherein the instructions cause the computing platform to update the at least one linked digital wallet based on the transaction request.

3. The non-transitory computer readable media of claim 1, wherein the transaction request is read from a blockchain, and wherein the instructions further cause the computing platform to record transaction confirmation instructions to the blockchain.

4. The non-transitory computer readable media of claim 1, wherein the instructions further cause the computing platform to compare geolocation information of the transaction request to that of predetermined criteria, wherein the transaction information transmitted to the user computing device includes an indication of any discrepancy therebetween.

5. The non-transitory computer readable media of claim 1, wherein a participant is associated with one or more participant categories, and wherein the instructions further cause the computing platform to compare the one or more participant categories to that of predetermined criteria, wherein the transaction information transmitted to the user computing device includes an indication of any discrepancy therebetween.

6. The non-transitory computer readable media of claim 1, wherein the instructions further cause the computing platform to compare the transaction request to previous transactions from a participant, wherein the transaction information sent to the user computing device includes an indication of any significant discrepancy therebetween.

7. The non-transitory computer readable media of claim 1, wherein the instructions further cause the computing platform to receive from a participant computing device cryptographic authentication information verifying an identity of the participant.

8. The non-transitory computer readable media of claim 1, wherein instructions further cause the computing platform to receive, from the user computing device, information responsive to an inquiry contained in the notification, wherein a transaction confirmation is transmitted to a participant after receiving responsive information.

9. The non-transitory computer readable media of claim 1, wherein the instructions further cause the computing platform to modify one or more linked digital wallets used for completion of the transaction request based on user defined settings, machine learning, or a combination thereof.

10. A method, comprising:

receiving, based on information corresponding to a transaction request, information corresponding to at least two linked digital wallets associated with the transaction request and being associated with a user, each linked digital wallet of the at least two linked digital wallets comprises lightweight nodes of a decentralized peer-to-peer network;

determining, based on an exchange rate, whether an amount specified in the transaction request is larger than an available amount each linked digital wallet of the at least two linked digital wallets, wherein each linked digital wallet of the at least two linked digital wallets is associated with a key identifying criteria associated with a corresponding digital wallet and wherein the criteria comprise a use type designation and a currency type;

modifying, automatically by an abstract intelligence layer and based on learning corresponding to historical usage patterns, digital wallet associations for different transaction types;

executing a digital signature algorithm using private/public key pairs to authenticate at least one linked digital wallet of the at least two linked digital wallets;

completing, automatically, the requested transaction using a first amount from a first linked digital wallet based on a first exchange rate and a second amount from a second linked digital wallet based on a second exchange rate;

teaching, based on a completed transaction and responses to user inquiries, the abstract intelligence layer to learn new transaction patterns; and sending, to a user computing device, transaction information for display of a notification on the user computing device.

11. The method of claim 10, further comprising updating the at least one linked digital wallet based on the transaction request.

12. The method of claim 10, further comprising:

reading the transaction request from a blockchain; and recording transaction confirmation instructions to the blockchain.

13. The method of claim 10, further comprising comparing geolocation information of the transaction request to that of predetermined criteria, wherein the transaction information sent to the user computing device includes an indication of any discrepancy therebetween.

14. The method of claim 10, further comprising comparing one or more participant categories to that of predetermined criteria, wherein the transaction information sent to the user computing device includes an indication of any discrepancy therebetween.

15. The method of claim 10, further comprising comparing the transaction request to previous transactions from a participant, wherein the transaction information sent to the user computing device includes an indication of any significant discrepancy therebetween.

16. The method of claim 10, further comprising receiving, from the user computing device, information responsive to an inquiry contained in the notification, wherein allocation information is generated in part based on responsive information.

17. The method of claim 10, further comprising receiving, from a participant computing device, cryptographic authentication information verifying an identity of a participant.

18. The method of claim 10, further comprising modifying one or more linked digital wallets used for completion of the transaction request based on user defined settings, machine learning, or a combination thereof.

19. A system comprising:

a user computing device comprising a display that, based on received transaction information, displays notifications to a user of the user computing device; and a server comprising:

a processor; and a non-transitory computer readable medium storing instructions that, when executed by the processor, causes the server to:

receive, based on information corresponding to a transaction request, information corresponding to at least two linked digital wallets associated with the transaction request and being associated with a user, wherein each linked digital wallet of the at least two linked digital wallets comprises lightweight nodes of a decentralized peer-to-peer network;

determine, based on an exchange rate, whether an amount specified in the transaction request is larger than an available amount in each linked digital wallet of the at least two linked digital wallets;

modify, automatically by an abstract intelligence layer and based on learning corresponding to historical usage patterns, digital wallet associations for different transaction types, wherein each linked digital wallet of the at least two linked digital wallets is associated with a key identifying criteria associated with a corresponding digital wallet and wherein the criteria comprise a use type designation and a currency type;

execute a digital signature algorithm using private/public key pairs to authenticate at least one linked digital wallets of the at least two linked digital wallets;

complete, automatically, the requested transaction using a first amount from a first linked digital wallet based on a first exchange rate and a second amount from a second linked digital wallet based on a second exchange rate;

teach, based on a completed transaction and responses to user inquiries, the abstract intelligence layer to learn new transaction patterns; and trigger, by sending transaction information to the user computing device, display of a notification to the user.

20. The system of claim 19, wherein the instructions further cause the server to receive from a participant computing device cryptographic authentication information verifying an identity of a participant.

* * * * *